(12) United States Patent
Zhang et al.

(10) Patent No.: US 11,054,829 B2
(45) Date of Patent: Jul. 6, 2021

(54) MULTIMODAL MOTION PLANNING FRAMEWORK FOR AUTONOMOUS DRIVING VEHICLES

(71) Applicant: Baidu USA LLC, Sunnyvale, CA (US)

(72) Inventors: Yajia Zhang, Sunnyvale, CA (US); Dong Li, Sunnyvale, CA (US); Liangliang Zhang, Sunnyvale, CA (US); Kecheng Xu, Sunnyvale, CA (US); Jiaming Tao, Sunnyvale, CA (US); Yifei Jiang, Sunnyvale, CA (US); Qi Luo, Sunnyvale, CA (US); Jiangtao Hu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 205 days.

(21) Appl. No.: 16/037,908

(22) Filed: Jul. 17, 2018

(65) Prior Publication Data

US 2020/0026276 A1    Jan. 23, 2020

(51) Int. Cl.
*G05D 1/00* (2006.01)
*G01C 21/34* (2006.01)
*G05D 1/02* (2020.01)

(52) U.S. Cl.
CPC ....... *G05D 1/0088* (2013.01); *G01C 21/3446* (2013.01); *G05D 1/0212* (2013.01); *G05D 2201/0213* (2013.01)

(58) Field of Classification Search
None
See application file for complete search history.

(56) References Cited

U.S. PATENT DOCUMENTS

| 2018/0004206 A1* | 1/2018 | Iagnemma | ............ B60W 10/18 |
| 2018/0088576 A1 | 3/2018 | Kong et al. | |
| 2019/0078899 A1* | 3/2019 | Iagnemma | ............ G01C 21/34 |
| 2019/0301873 A1* | 10/2019 | Prasser | ................... G06T 17/05 |

FOREIGN PATENT DOCUMENTS

| DE | 102013217871 A1 * | 3/2015 | ........... G08G 1/0112 |
| JP | 2016031297 A | 3/2016 | |
| WO | 2018044340 | 3/2018 | |

\* cited by examiner

*Primary Examiner* — Kelly D Williams
(74) *Attorney, Agent, or Firm* — Womble Bond Dickinson (US) LLP

(57) ABSTRACT

Methods and systems for multimodal motion planning framework for autonomous driving vehicles are disclosed. In one embodiment, driving environment data of an autonomous vehicle is received, where the environment data includes a route segment. The route segment is segmented into a number of route sub-segments. A specific driving scenario is assigned to each of the route sub-segments, where each specific driving scenario is included in a set of driving scenarios. A first motion planning algorithm is assigned according to a first assigned driving scenario included in the set of driving scenarios. The first motion planning algorithm is invoked to generate a first set of trajectories. The autonomous vehicle is controlled based on the first set of trajectories.

21 Claims, 8 Drawing Sheets

MULTIMODAL MOTION PLANNING FRAMEWORK FOR AUTONOMOUS DRIVING VEHICLES

TECHNICAL FIELD

Embodiments of the present disclosure relate generally to operating autonomous vehicles. More particularly, embodiments of the disclosure relate to multimodal motion planning framework for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. While a number of motion planning algorithms have been developed, they generally take an assumption of a driving environment, and are categorized into two categories. In one category, the domain structure of a driving environment is exploited such that high quality trajectories can be generated in fast planning cycles (e.g., 10 Hz). However, if the driving environment is significantly different from the assumption (e.g., in a parking lot or unmapped area), feasible solutions cannot be generated using a motion planning algorithm in this category. In another category, the assumption of a driving environment is taken to a lesser degree. A motion planning algorithm in this category generally has a broader search space, but it generates trajectories at a slower rate or less efficient as compared to a motion planning algorithm in the first category.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
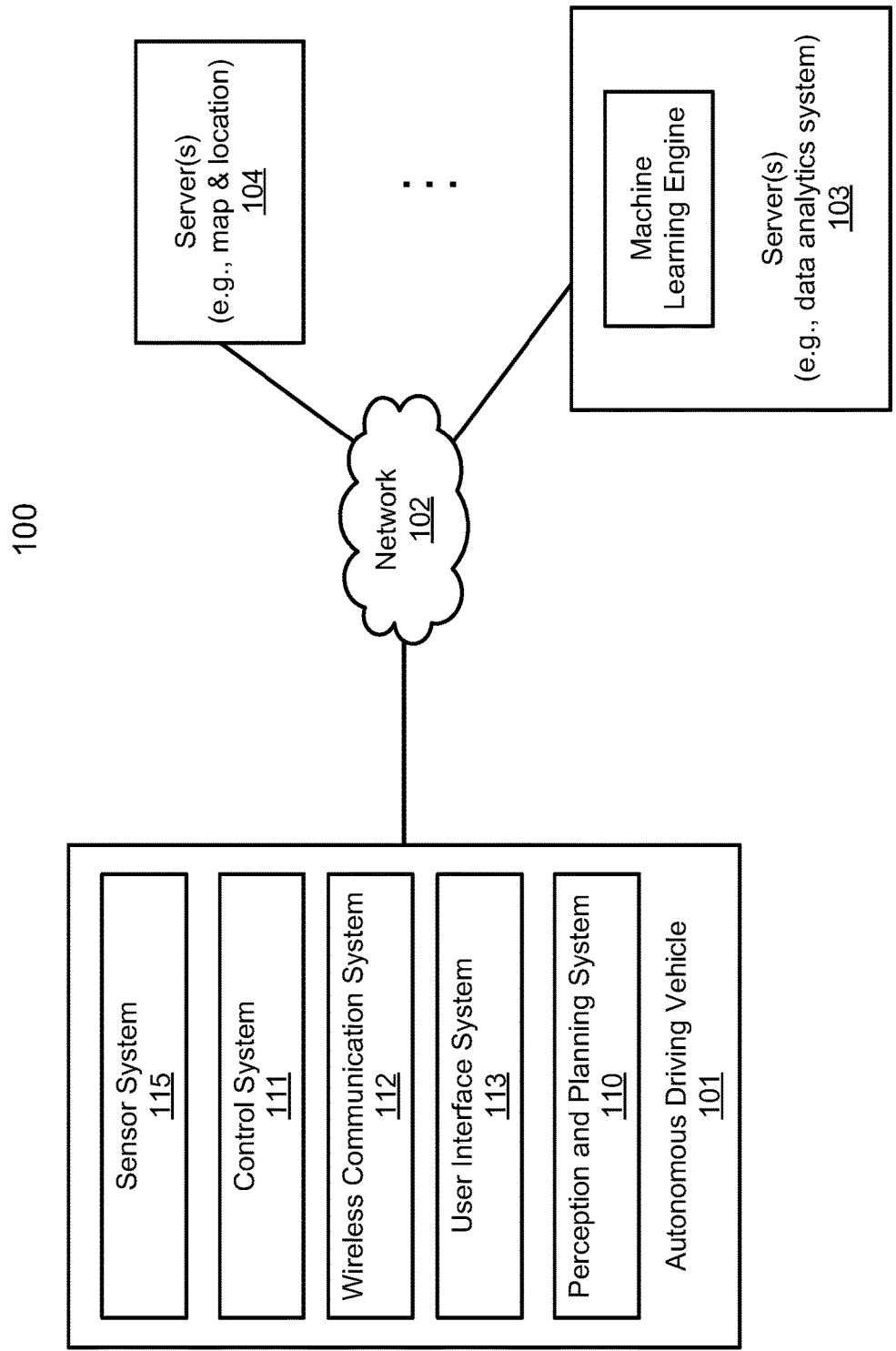
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, when an autonomous vehicle travels along a route or path, the path may take the autonomous vehicle through a number of driving scenarios including an urban/city scenario, a highway scenario, a parking lot scenario (e.g., parking lot within shopping mall, church, school, etc.), or an unmapped scenario (e.g., undeveloped land or developed land that has not been updated on a map). Thus, it is beneficial for the autonomous vehicle to invoke different motion planning algorithms (or motion planners) to traverse the route, with each algorithm specifically handling each driving scenario. For example, a route segment on which the autonomous vehicle travels may be segmented into a number of route sub-segments. Using driving environment data (e.g., map and route information, location information, surrounding information, etc.), a specific driving scenario may be assigned to each of the sub-segments. In one embodiment, the driving scenario may be an urban/city scenario, a highway scenario, a parking lot scenario, or an unmapped scenario. As the autonomous vehicle moves along each sub-segment, a corresponding assigned scenario may be generated. Based on the generated scenario, a motion planner (or motion planning algorithm), such as rapid exploring random tree (RRT), may be assigned to operate the autonomous vehicle. Such motion planner may then be invoked to generate a set of trajectories that control the autonomous vehicle through the sub-segment.

In one embodiment, driving environment data of an autonomous vehicle is received, where the environment data includes a route segment. The route segment is segmented into a number of route sub-segments. A specific driving scenario is assigned to each of the route sub-segments, where each specific driving scenario is included in a set of driving scenarios. A first motion planning algorithm is assigned according to a first assigned driving scenario included in the set of driving scenarios. The first motion planning algorithm is invoked to generate a first set of trajectories. The autonomous vehicle is controlled based on the first set of trajectories.

In another embodiment, a second motion planning algorithm is assigned according to a second assigned driving scenario included in the set of driving scenarios. The second motion planning algorithm is invoked to generate a second set of trajectories. The autonomous vehicle is controlled based on the second set of trajectories.

In still another embodiment, to assign a specific driving scenario to each of the route sub-segments, the first driving scenario is assigned to a first route sub-segment, and the second driving scenario is assigned to a second route sub-segment. The first route sub-segment and the second route sub-segment are included in the number of route sub-segments.

In yet another embodiment, to further assign a specific driving scenario to each of the route sub-segments, a third driving scenario is assigned to a third route sub-segment, and a fourth driving scenario is assigned to a fourth route sub-segment. The third route sub-segment and the fourth route sub-segment are included in the number of route sub-segments.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
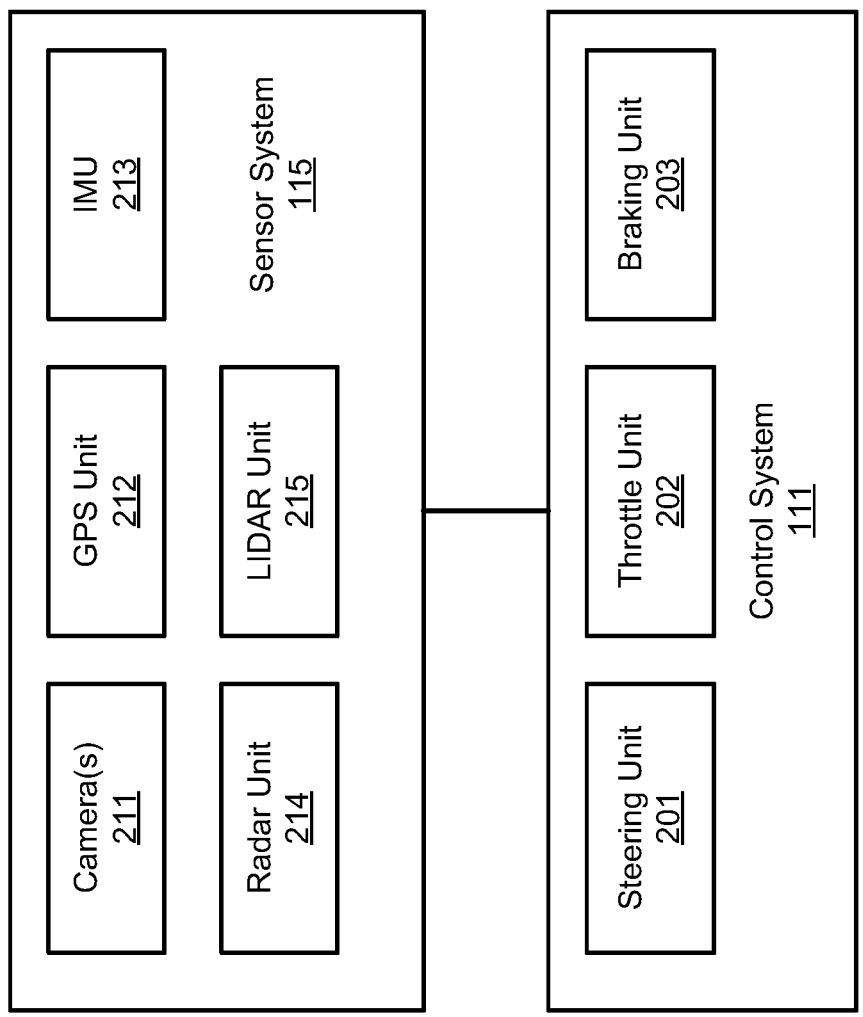
FIG. 2 is a block diagram illustrating an example of a sensor system and a control system used with an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Figure 3A:
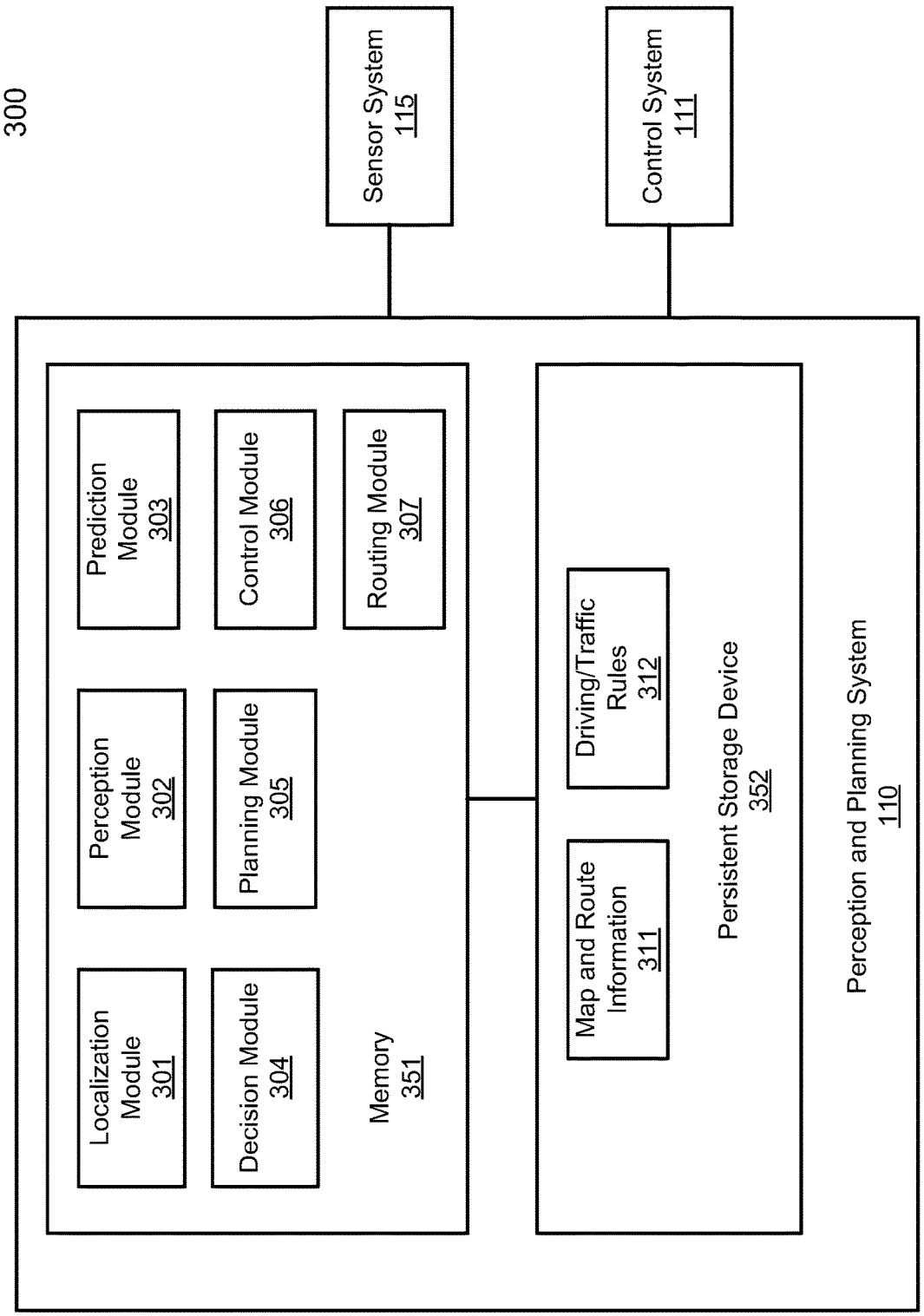
FIGS. 3A-3B are block diagrams illustrating an example of a perception and planning system used with an autonomous vehicle according to one embodiment.
Figure 3B:
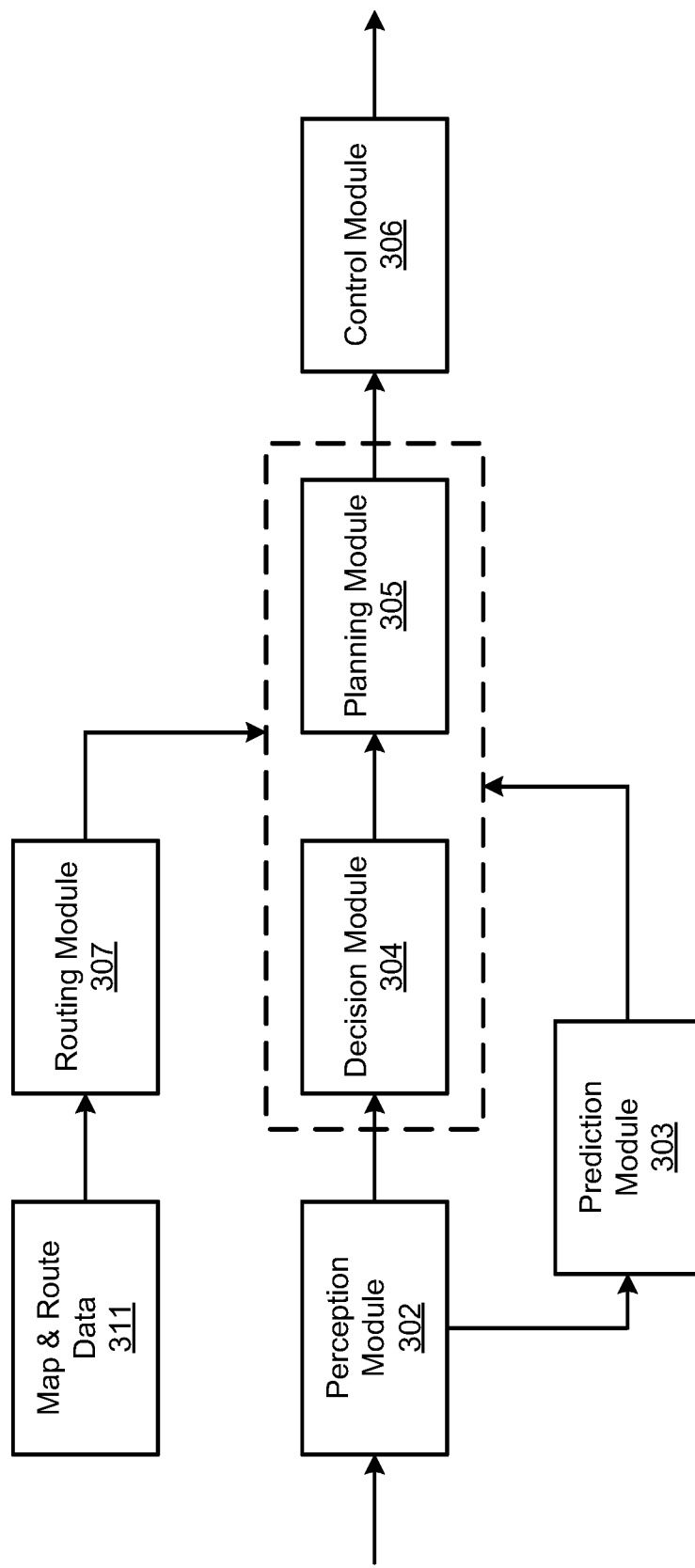

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 101, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figures 4A, 4B:
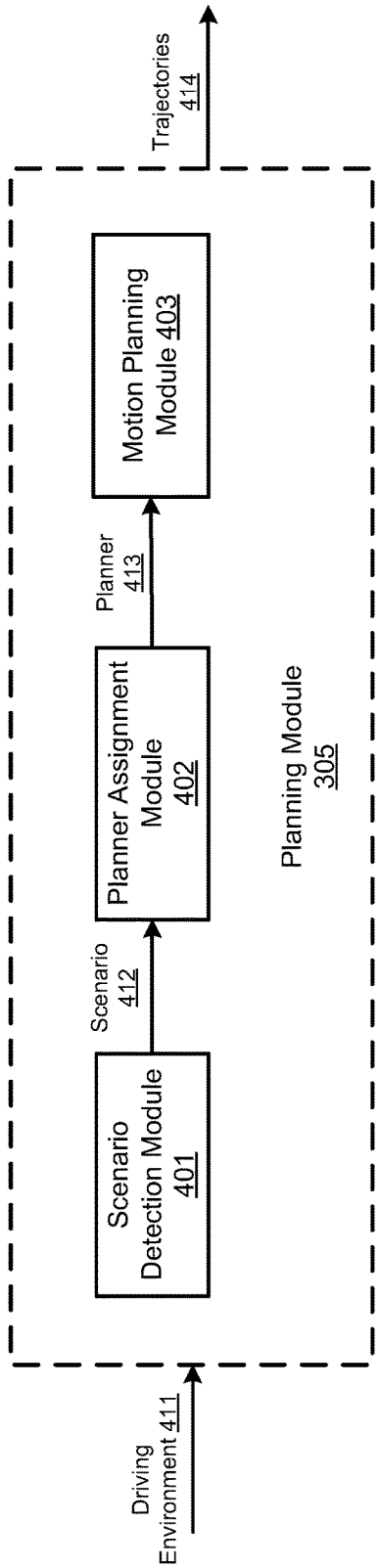
FIG. 4A is a block diagram illustrating an example of a planning module of the perception and planning system according to one embodiment.
FIG. 4B is a diagram illustrating examples of a scenario according to one embodiment.

FIG. 4A is a block diagram illustrating an example of a planning module of the perception and planning system according to one embodiment. Referring to FIG. 4A, in one embodiment, planning module 305 may include scenario detection module 401, planner assignment module 402, and motion planning module 403. Of course, in another embodiment, scenario detection module 401, planer assignment module 402, and motion planning module 403 may be implemented outside the planning module 305, and as part of perception and planning system 110.

With continued reference to FIG. 4A, scenario detection module 401 may receive driving environment data 411, for example from localization module 301 and perception module 302. Driving environment data 411 may include map and route information 311 (or MPOI information), surrounding information (e.g., obstacle information, lane information, point of interest (POI) information, such as landmarks, churches, schools, etc.) of the autonomous vehicle (e.g., as provided by perception module 302), and location information (e.g., a current location) of the autonomous vehicle (e.g., as provided by localization module 301). Based on the driving environment data 411, scenario detection module 401 may detect and generate a scenario 412. For example, for a particular route or path segment (e.g., from route information) in which the autonomous vehicle may travel through, the route segment may take the autonomous vehicle through a number of areas (or regions) on a map (e.g., map 500 of FIG. 5 as discussed in more detail herein below), such as an urban area, a highway, a parking lot, an unmapped area, or any other areas where the autonomous vehicle can travel through. Therefore, the planning module 305 may need to recognize a scenario associated with each area (or region) in order to determine a specific driving plan to drive the autonomous vehicle through each area. Accordingly, scenario detection module 401 may take driving environment data 411 (and real-time traffic information in one embodiment) as inputs, and segment (or divide) a next route or path segment into a sequence of route sub-segments. Each route sub-segment may be assigned to (or labelled with) a specific driving scenario (e.g., scenario 412) from a set of driving scenarios. The driving scenario, for example, may be determined based on labelled map information (e.g., territories, points of interest (POIs), streets, highways, or other parameters) that indicates a particular region within a map the sub-segment is associated with.

Referring now to FIG. 4B, scenario 412 may be represented by (or include) any scenario value of scenario values 421 and/or corresponding scenario label of scenario labels 422. As further shown in FIG. 4B, a scenario value of "0" may correspond to a label "Urban" which indicates that a route sub-segment is associated with (or within) an urban area. Similarly, a scenario value of "1" may correspond to a label "Highway" which indicates that the route sub-segment is associated with (or on) a highway, a scenario value of "2" may correspond to a label "Parking Lot" which indicates that the route sub-segment is associated with (or within) a parking lot, and so on. In one embodiment, a "Default" scenario value may correspond to a label "Unmapped", which indicates that a route sub-segment is associated with an undefined (or unmapped) region. To detect a particular scenario for each route sub-segment, in one embodiment scenario detection module 401 may utilize map and route information 311 to determine a specific area on a map (e.g., urban, highway, parking lot, unmapped, etc.) the route sub-segment is associated with. Additionally or alternatively, in one embodiment scenario detection module 401 may utilize the surrounding information, POI information, and/or real-time traffic information to detect the scenario. For instance, if there are upcoming traffics, surrounding obstacles, and/or POIs for a particular route sub-segment, scenario detection module 401 may be determined that the route sub-segment is associated with an urban area. Otherwise, the route sub-segment may be associated with a highway. Moreover, if a route sub-segment includes a number of slow-moving (or fixed) obstacles (e.g., pedestrians, other vehicles) and lanes, scenario detection module 401 may determine that the route sub-segment is associated with a parking lot.

In one embodiment, the "Default" scenario value may be any predefined value in a set of scenario values, such as a highest or lowest value in the set. It should be noted that while FIG. 4B shows scenario values 421 of "0", "1", and "2" as respectively corresponding to scenario labels 422 "Urban", "Highway", and "Parking Lot", such scenario values are merely examples. One of ordinary skill in the art would understand that any values may be used to represent the different labels. It should also be noted that the list of scenario labels 422 is not an exhausted list, and additional labels associated with other regions on a map may also be part of the list. It should further be noted that the scenario labels 422 previously described are merely examples. One of ordinary skill in the art would understand that the labels may be formulated in any fashion, for example "City" instead of "Urban", "Freeway" instead of "Highway", etc.

With continued reference to FIG. 4A, using the driving environment 411 (e.g., current location of the autonomous vehicle, map and route information, etc.), scenario detection module 401 may generate an assigned scenario 412 in connection with a particular route sub-segment while the autonomous vehicle is travelling along the route sub-segment. Based on the assigned scenario 412, planner assignment module 402 may assign a specific motion planner (or planning algorithm) 413 to operate the autonomous vehicle along the route sub-segment. The motion planner 413, for example, may be any motion planning algorithm, such as rapid exploring random tree (RRT). In one embodiment, motion planner 413 may be a motion planner value indicative of a specific motion planner (or planning algorithm) to use to operate the autonomous vehicle.

Figure 5:
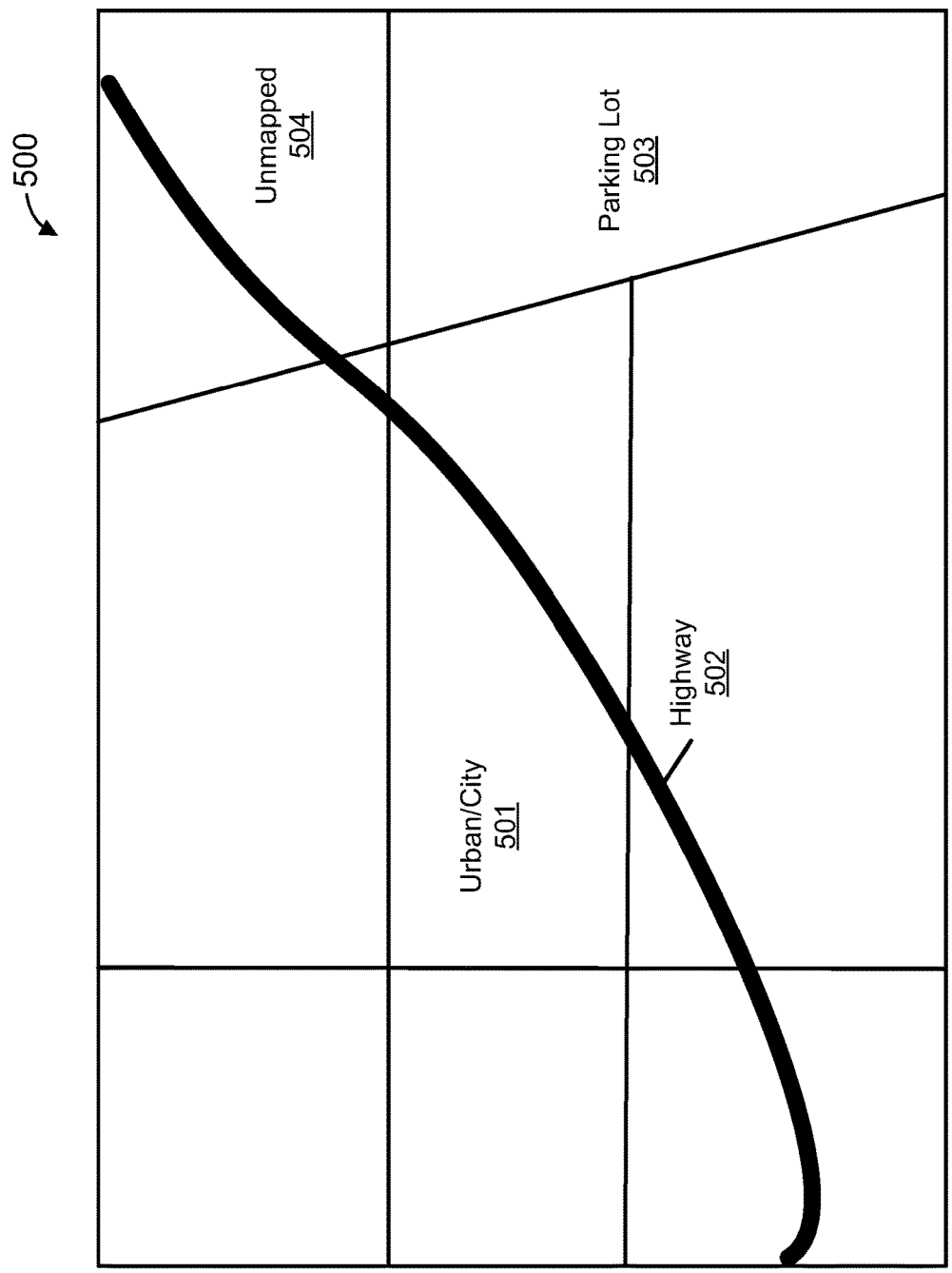
FIG. 5 is a diagram illustrating an example of a map having different scenarios according to one embodiment.

To further illustrate the point, referring now to FIG. 5, which is a diagram illustrating an example of a map having different scenarios according to one embodiment. In FIG. 5, map 500 includes, but not limited to, an urban or city region 501, highway 502, parking lot 503, and unmapped region 504. If planner assignment module 402 receives scenario 412 indicative of "Urban", for example, it may assign a first motion planner that operates the autonomous vehicle in region 501. The first motion planner, for instance, may take into account street intersections, lane information, and other road information to operate the autonomous vehicle within a city environment. If planner assignment module 402 receives scenario 412 indicative of "Highway", for example, it may assign a second motion planner that operates the autonomous vehicle on highway 502. This second motion planner, for example, may take into account lane information to operate the vehicle on a highway environment. If planner assignment module 402 receives scenario 412 indicative of "Parking Lot", for example, it may assign a third motion planner that operates the autonomous vehicle within a parking lot 503 (e.g., parking lot of a shopping mall, a church, a school, etc.). In doing so, the third motion planner for example may take into account parking lane information (e.g., locations of parking lanes) associated with parking spaces and obstacle information (e.g., pedestrians, other vehicles) to control the autonomous vehicle within a parking lot environment. Alternatively, if planner assignment module 402 receives scenario 412 indicative of "Unmapped", for example, it may assign a fourth motion planner that operates the autonomous vehicle within an unmapped (or undefined) region 504 (e.g., undeveloped land or developed land that have not been updated on a map, such as map 500). This fourth motion planner, for example, may assume a driving environment to a lesser extent. For instance, it may operate the autonomous vehicle based on obstacles perceived from the driving environment.

Referring back to FIG. 4A, motion planning module 403 may include and/or operate a number of motion planners (or motion planning algorithms). Each motion planner may be assigned to a specific scenario (as previously described). In response to receiving an assigned motion planner 413 from planner assignment module 402, motion planning module 403 may invoke the motion planner 413 to generate one or more trajectories 414 to control the autonomous vehicle. In some embodiments, the trajectories 414 may also be generated based on sensor data from sensor system 115.

Figure 6:
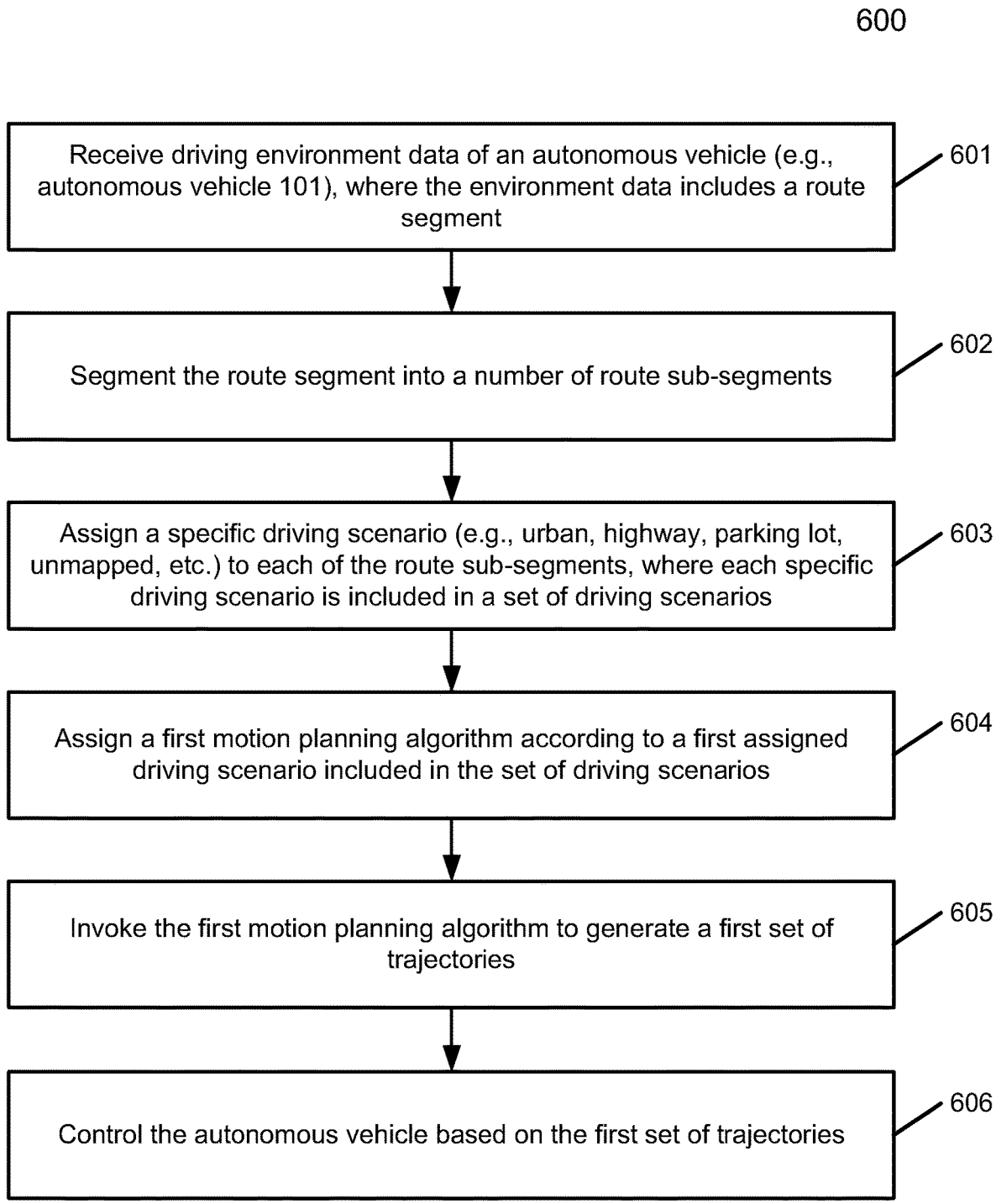
FIG. 6 is a flow diagram illustrating a process of operating an autonomous vehicle according to one embodiment.

FIG. 6 is a flow diagram illustrating a process of operating an autonomous vehicle according to one embodiment. Process 600 may be performed by processing logic which may include software, hardware, or a combination thereof. For example, process 600 may be performed by the perception and planning system 110 of FIG. 1.

Referring to FIG. 6, at block 601, the processing logic receives driving environment data of an autonomous vehicle (e.g., autonomous vehicle 101), where the environment data includes a route segment. At block 602, the processing logic segments the route segment into a number of route sub-segments. At block 603, the processing logic assigns a specific driving scenario (e.g., urban, highway, parking lot, unmapped, etc.) to each of the route sub-segments, where each specific driving scenario is included in a set of driving scenarios. At block 604, the processing logic assigns a first motion planning algorithm according to a first assigned driving scenario included in the set of driving scenarios. At block 605, the processing logic invokes the first motion planning algorithm to generate a first set of trajectories. At block 606, the processing logic controls the autonomous vehicle based on the first set of trajectories.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
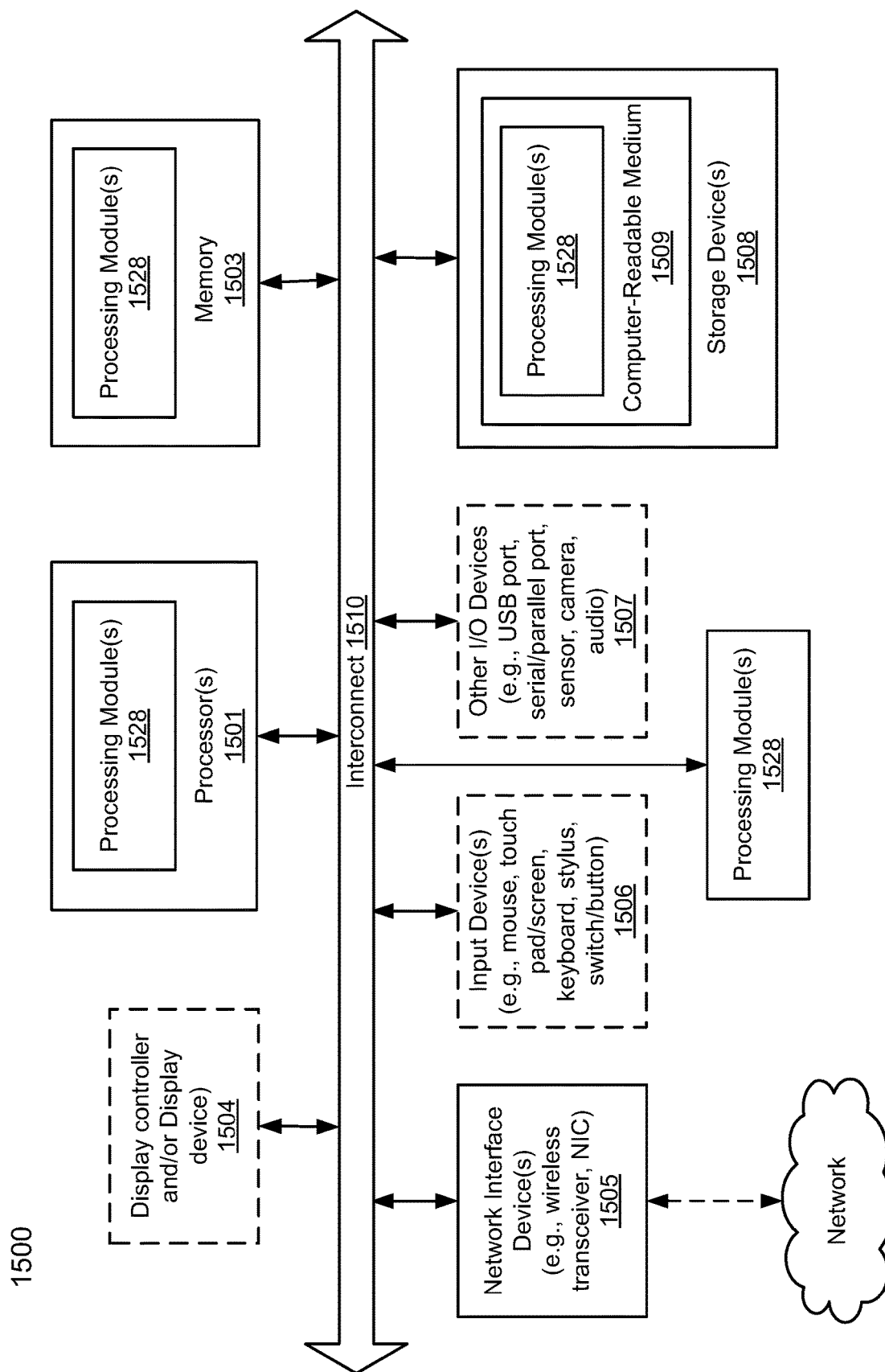
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305 and control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICs, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous vehicle, comprising:
receiving driving environment data of the autonomous vehicle;
segmenting a route segment on which the autonomous vehicle travels into a plurality of route sub-segments;
assigning a specific driving scenario to each of the plurality of route sub-segments based on the received driving environment data, wherein each specific driving scenario is included in a set of driving scenarios, the set of driving scenarios including a parking lot scenario and an unmapped scenario;

assigning a first motion planning algorithm to operate the autonomous vehicle along a first route sub-segment according to a first assigned driving scenario included in the set of driving scenarios;
invoking the first motion planning algorithm to generate a first set of trajectories; and
controlling the autonomous vehicle based on the first set of trajectories.

2. The method of claim 1, further comprising:
assigning a second motion planning algorithm to operate the autonomous vehicle along a second route sub-segment according to a second assigned driving scenario included in the set of driving scenarios;
invoking the second motion planning algorithm to generate a second set of trajectories; and
controlling the autonomous vehicle based on the second set of trajectories.

3. The method of claim 2, wherein assigning a specific driving scenario to each of the plurality of route sub-segments comprises:
assigning the first driving scenario to the first route sub-segment, and
assigning the second driving scenario to the second route sub-segment,
wherein the first route sub-segment and the second route sub-segment are included in the plurality of route sub-segments.

4. The method of claim 3, wherein assigning a specific driving scenario to each of the plurality of route sub-segments further comprises:
assigning a third driving scenario to a third route sub-segment, and
assigning a fourth driving scenario to a fourth route sub-segment,
wherein the third route sub-segment and the fourth route sub-segment are included in the plurality of route sub-segments.

5. The method of claim 3, further comprising:
generating the first assigned driving scenario when the autonomous vehicle is operated to travel on the first route sub-segment; and
generating the second assigned driving scenario when the autonomous vehicle is operated to travel on the second route sub-segment.

6. The method of claim 1, wherein the specific driving scenario is assigned based on map and route information included in the driving environment data.

7. The method of claim 1, wherein the set of driving scenarios further includes an urban scenario and a highway scenario.

8. A non-transitory machine-readable medium having instructions stored therein, which when executed by a processor, cause the processor to perform operations, the operations comprising:
receiving driving environment data of an autonomous vehicle;
segmenting a route segment on which the autonomous vehicle travels into a plurality of route sub-segments;
assigning a specific driving scenario to each of the plurality of route sub-segments based on the received driving environment data, wherein each specific driving scenario is included in a set of driving scenarios, the set of driving scenarios including a parking lot scenario and an unmapped scenario;
assigning a first motion planning algorithm to operate the autonomous vehicle along a first route sub-segment according to a first assigned driving scenario included in the set of driving scenarios;
invoking the first motion planning algorithm to generate a first set of trajectories; and
controlling the autonomous vehicle based on the first set of trajectories.

9. The non-transitory machine-readable medium of claim 8, wherein the operations further comprise:
assigning a second motion planning algorithm to operate the autonomous vehicle along a second route sub-segment according to a second assigned driving scenario included in the set of driving scenarios;
invoking the second motion planning algorithm to generate a second set of trajectories; and
controlling the autonomous vehicle based on the second set of trajectories.

10. The non-transitory machine-readable medium of claim 9, wherein assigning a specific driving scenario to each of the plurality of route sub-segments comprises:
assigning the first driving scenario to the first route sub-segment, and
assigning the second driving scenario to the second route sub-segment,
wherein the first route sub-segment and the second route sub-segment are included in the plurality of route sub-segments.

11. The non-transitory machine-readable medium of claim 10, wherein assigning a specific driving scenario to each of the plurality of route sub-segments further comprises:
assigning a third driving scenario to a third route sub-segment, and
assigning a fourth driving scenario to a fourth route sub-segment,
wherein the third route sub-segment and the fourth route sub-segment are included in the plurality of route sub-segments.

12. The non-transitory machine-readable medium of claim 10, wherein the operations further comprise:
generating the first assigned driving scenario when the autonomous vehicle is operated to travel on the first route sub-segment; and
generating the second assigned driving scenario when the autonomous vehicle is operated to travel on the second route sub-segment.

13. The non-transitory machine-readable medium of claim 8, wherein the specific driving scenario is assigned based on map and route information included in the driving environment data.

14. The non-transitory machine-readable medium of claim 8, wherein the set of driving scenarios further includes an urban scenario and a highway scenario.

15. A data processing system, comprising:
a processor; and
a memory coupled to the processor to store instructions, which when executed by the processor, cause the processor to perform operations, the operations including
receiving driving environment data of an autonomous vehicle;
segmenting a route segment on which the autonomous vehicle travels into a plurality of route sub-segments;
assigning a specific driving scenario to each of the plurality of route sub-segments based on the received driving environment data, wherein each specific driving scenario is included in a set of driving scenarios, the set of driving scenarios including a parking lot scenario and an unmapped scenario;

assigning a first motion planning algorithm to operate the autonomous vehicle along a first route sub-segment according to a first assigned driving scenario included in the set of driving scenarios;

invoking the first motion planning algorithm to generate a first set of trajectories; and controlling the autonomous vehicle based on the first set of trajectories.

16. The data processing system of claim 15, wherein the operations further include:

assigning a second motion planning algorithm to operate the autonomous vehicle along a second route sub-segment according to a second assigned driving scenario included in the set of driving scenarios;

invoking the second motion planning algorithm to generate a second set of trajectories; and controlling the autonomous vehicle based on the second set of trajectories.

17. The data processing system of claim 16, assigning a specific driving scenario to each of the plurality of route sub-segments comprises:

assigning the first driving scenario to the first route sub-segment, and assigning the second driving scenario to the second route sub-segment, wherein the first route sub-segment and the second route sub-segment are included in the plurality of route sub-segments.

18. The data processing system of claim 17, wherein assigning a specific driving scenario to each of the plurality of route sub-segments further comprises:

assigning a third driving scenario to a third route sub-segment, and assigning a fourth driving scenario to a fourth route sub-segment, wherein the third route sub-segment and the fourth route sub-segment are included in the plurality of route sub-segments.

19. The data processing system of claim 17, wherein the operations further include:

generating the first assigned driving scenario when the autonomous vehicle is operated to travel on the first route sub-segment; and generating the second assigned driving scenario when the autonomous vehicle is operated to travel on the second route sub-segment.

20. The data processing system of claim 15, wherein the specific driving scenario is assigned based on map and route information included in the driving environment data.

21. The data processing system of claim 15, wherein the set of driving scenarios further includes an urban scenario and a highway scenario.

* * * * *